United States Patent [19]

Kraft et al.

[11] 4,014,836
[45] Mar. 29, 1977

[54] FIRE RETARDANT POLYMERIC ADDITIVES

[75] Inventors: Paul Kraft, Spring Valley; Siegfried Altscher, Monsey, both of N.Y.

[73] Assignee: Stauffer Chemical Company, Westport, Conn.

[22] Filed: Jan. 2, 1976

[21] Appl. No.: 646,086

Related U.S. Application Data

[60] Division of Ser. No. 397,515, Sept. 17, 1973, Pat. No. 3,948,842, which is a continuation-in-part of Ser. Nos. 49,204, June 23, 1970, Pat. No. 3,725,509, and Ser. No. 160,905, July 8, 1971, abandoned.

[52] U.S. Cl. .................... 260/29.6 TA; 260/17 R; 260/29.6 MP; 260/29.7 T; 260/63 UY; 260/899; 427/408; 526/274; 526/303; 526/319
[51] Int. Cl.² .................. C08L 43/02; C08L 27/00
[58] Field of Search .......... 260/29.6 TA, 29.6 MP; 526/274, 303, 319

[56] References Cited

UNITED STATES PATENTS

| | | | |
|---|---|---|---|
| 3,682,871 | 8/1972 | Mikofalvy et al. | 260/29.6 TA |
| 3,691,127 | 9/1972 | Kraft et al. | 260/29.6 TA |
| 3,883,463 | 5/1975 | Jin et al. | 260/29.6 TA |
| 3,948,842 | 4/1976 | Kraft et al. | 260/29.6 TA |

*Primary Examiner*—Lucille M. Phynes
*Attorney, Agent, or Firm*—Richard P. Fennelly

[57] ABSTRACT

A fire retardant additive comprising particles of a polymer of:

1. at least one halogen-containing alpha, beta-ethylenically unsaturated monomer;

2. at least one bis(hydrocarbyl)vinyl phosphonate having the structure:

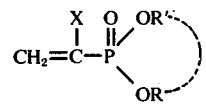

wherein X is selected from the group consisting of hydrogen, halogen, cyano, aryl, $C_1$–$C_{18}$ alkyl and

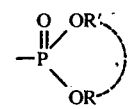

wherein R and R' are hydrocarbyl and substituted hydrocarbyl groups which can be the same, different or conjoint; and, 3. at least one third comonomer selected from the group consisting of alpha olefins, vinyl esters of carboxylic acids, $C_1$–$C_{20}$ alkyl esters of acrylic and methacrylic acid, ethylenically unsaturated dicarboxylic acids, the corresponding anhydrides thereof and the $C_1$–$C_{20}$ mono and dialkyl esters thereof, amides of ethylenically unsaturated carboxylic acids and the N-methylol and diacetone derivatives thereof, vinyl aryl compounds, $C_1$–$C_{20}$ alkyl vinyl esters, aliphatic dienes and glycidyl esters of acrylic and methacrylic acid.

The polymers of the present invention are useful as fire retardant additives for coatings, adhesives, binders, impregnants, laminants, paint bases, other polymers and the like.

10 Claims, No Drawings

FIRE RETARDANT POLYMERIC ADDITIVES

RELATED APPLICATIONS

This is a division of application Ser. No. 397,515 filed Sept. 17, 1973 and now U.S. Pat. No. 3,948,842, granted Apr. 6, 1976 which, in turn, is a continuation-in-part of application Ser. No. 49,204, filed June 23, 1970, now U.S. Pat. No. 3,725,509, granted Apr. 3, 1973, and the now abandoned application Ser. No. 160,905, filed July 8, 1971, the latter application, in turn, being a continuation-in-part of the former application. The respective disclosures of both of said applications are incorporated herein by reference.

BACKGROUND OF THE INVENTION

Polymers of halogen-containing ethylenically unsaturated monomers, such as the vinyl or vinylidene halides, are often prepared as aqueous latices or emulsions in which form they may be conveniently used as coatings, adhesives, paint bases, binders for non-woven fabrics, coatings for woven fabrics including fabrics prepared from natural, synthetic, mineral or glass fibers and in various other types of applications. In many instances, particularly where they are being considered for building interiors or in uses repairing their prolonged exposure to high temperatures, it is highly desirable and advantageous that these latices should display enhanced fire or flame retardant properties and color stability so that they may be safely employed in place of more costly materials. Moreover, it is highly desirable and advantageous that these latices when applied to flexible substrates, should impart a desirably soft "hand" to said substrates.

Prior attempts to provide fire retardant, film-forming vinyl or vinylidene halide polymer latices have involved the preparation of various polymeric compositions including copolymer latices of vinyl halides and alkyl acrylates, copolymer latices of vinyl halides and vinylidene chloride and polyvinyl halide latices containing an extraneously added phosphate ester plasticizer. Other attempts have involved the use of interpolymers of bis(β-chloroethyl) vinyl phosphonate with lower alkyl acrylates or methacrylates and acrylic or methacrylic nitriles. These interpolymers could additionally optionally include vinyl halides or vinylidene halides. Still other attempts have involved interpolymerization of vinylidene halide monomers with carboxylic acid monomers and N-alkylol acrylamide monomers. These latter interpolymers could optionally include other polymerizable comonomers such as esters of acrylic acid or methacrylic acid, vinyl acetate, acrylonitrile, methacrylonitrile, acrylamide or methacrylamide, styrene or bis(β-haloalkyl) vinyl phosphonates. However, despite the many and varied attempts to obtain a completely satisfactory polymeric latex, none of the above-described approaches has proven to be completely satisfactory as the resultant products are found, in many cases, to be lacking in either sufficient fire retardancy, color stability, mechanical stability, ultraviolet stability, softness of the polymers or the products are subject to the gradual loss of their extraneously added phosphate plasticizers.

Accordingly, it is an object of this invention to provide novel, fire retardant halogen-containing vinyl polymer additives which may be used in a variety of coating, binding, and laminating applications and which are characterized by their essentially complete freedom from the various disadvantageous properties heretofore associated with this type of product.

It is another object of this invention to provide a novel class of polymers in the form of aqueous emulsions or latices which are particularly useful, as additives, for preparing fire retardant, polymer compositions which are in the form of aqueous solutions, suspensions or, most preferably, emulsions.

It is a further object of this invention to provide solid polymeric fire retardant additives or blends by drying or coagulating or co-coagulating the polymer emulsions or latices of this invention by themselves or as blends with other polymeric emulsions or latices. The solid polymeric additives of the present invention can also be blended with ordinarily flammable solid polymers to give flame retardant polymeric blends.

It is still another object of the present invention to provide a novel class of polymers in the form of aqueous emulsions or latices which are particularly useful as binders for non-woven fabrics and coating for woven fabrics prepared from natural, synthetic, mineral, glass fibers or mixtures thereof.

Various other objects and advantages of this invention will be apparent from the disclosure thereof which follows hereinafter.

TECHNICAL DISCLOSURE OF THE INVENTION

In its broadest aspect, this invention resides in the discovery that a wide variety of polymers, particularly polymers in the form of solids, aqueous solutions, suspensions or, most preferably, emulsions, as well as a wide variety of fiber and fabric substrates may be rendered fire retardant by the incorporation therein or the application thereto of the novel polymeric additives of the present invention. These additives comprise polymers of: (1) one or more halogen-containing vinyl monomers with (2) one or more phosphorus-containing vinyl monomers as hereinafter defined, and (3) one or more additional comonomers as hereinafter further defined, these polymers being in the form of solid particles or particles in an aqueous emulsion or latex. More particularly, it has now been discovered that the use of aqueous emulsion or latex polymers or the coagula or dried particles thereof formed from one or more halogen-containing vinyl monomers with one or more bis(hydrocarbyl) vinyl phosphonates and one or more additional comonomers as hereinafter defined, impart to the resulting composition or material a high degree of fire retardance and excellent color stability without adversely affecting any of the significant physical properties thereof. In addition, it has been found that the polymers of the present invention impart a desirably soft hand to materials upon which they are coated or within which they are impregnated. Moreover, it is truly surprising and advantageous to find that polymer blends resulting from the process of this invention, particularly those blends which are in the form of an aqueous emulsion or latex system, display an outstanding degree of compatibility since, as is well known to those skilled in the art, physical blends of two or more polymers are almost always characterized by their inherently poor compatibility.

The novel polymers suitable for use as fire retardant additives in accordance with the process of this invention comprise polymers of:

1. at least one halogen-containing, alpha, beta-ethylenically unsaturated monomer, i.e., vinyl monomers including vinyl halides such as, for example, vinyl chloride, vinyl fluoride and vinyl bromide, halogenated $C_1-C_{12}$ alkyl acrylates and methacrylates such as, for example, methyl alpha-chloroacrylate and methyl alpha-bromoacrylate; vinylidene halides such as, for example, vinylidene chloride, vinylidene bromide, vinylidene chlorobromide and vinylidene fluoride; halo-substituted nitriles of ethylenically unsaturated carboxylic acids such as, for example, alpha-chloroacrylonitrile; and the chlorinated styrenes such as, for example alpha-chlorostyrene, o-chlorostyrene, m-chlorostyrene, p-chlorostyrene, and 2,4-dichlorostyrene;

2. at least one bis(hydrocarbyl)vinylphosphonate having the structure:

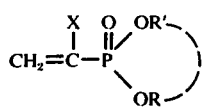

wherein X is selected from the group consisting of hydrogen, halogen, cyano, aryl such as phenyl, $C_1-C_{18}$ alkyl and

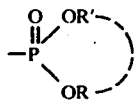

wherein
R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may combine to form one single radical; and 3. at least one comonomer including alpha olefins such as ethylene, propylene and butylene; vinyl esters of carboxylic acids, such as vinyl acetate, vinyl butyrate and vinyl stearate; and $C_1-C_{20}$ alkyl esters of acrylic acid and methacrylic acid such as methyl methacrylate, methyl acrylate, ethyl acrylate, n-butyl acrylate, sec.-butyl acrylate, tert.-butyl acrylate, 2-ethylhexyl acrylate, lauryl acrylate and the like; ethylenically unsaturated dicarboxylic acids, their anhydrides and their $C_1-C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide and their N-methylol and diacetone derivatives such as N-methylol acrylamide, N-methylol methacrylamide and diacetone acrylamide; vinyl aryl compounds such as styrene and alpha-methyl styrene; $C_1-C_{20}$ alkyl vinyl ethers such as methyl vinyl ether, ethyl vinyl ether and stearyl vinyl ether; dienes such as isoprene and butadiene; and glycidyl esters of acrylic and methacrylic acid such as glycidyl acrylate and glycidyl methacrylate. The preferred comonomers are the $C_1-C_{20}$ alkyl esters of acrylic and methacrylic acid especially the lower ($C_4-C_8$) alkyl acrylates.

It is considered preferably to include the N-methylol and diacetone derivatives of amides of ethylenically unsaturated carboxylic acids such as, for example, N-methylol acrylamide or diacetone acrylamide which serve to provide the resulting polymer with cross-linking sites.

The use, in this disclosure, of the expression "hydrocarbyl" and "substituted hydrocarbyl groups" in the definition of the suitable bis(hydrocarbyl)vinylphosphonates given hereinabove refers to the radicals obtained upon the removal of a hydrogen from a hydrocarbon or substituted hydrocarbon group which may be either an aliphatic or aromatic group. These hydrocarbyl groups may be substituted with any non-interfering groups, i.e., with any group which does not interfere with the polymerization of the bis-(hydrocarbyl)-vinylphosphonate. Such substituent groups include, for example, chloro, bromo, fluoro, nitro, hydroxy, sulfone, ethoxy, methoxy, nitrile, ether, ester and keto groups and the like.

Illustrative of the aliphatic and aromatic groups as are represented by R and R' in the structure of the bis-(hydrocarbyl)vinylphosphonate given hereinabove are alkyl groups, such as methyl, ethyl, propyl, butyl, pentyl, hexyl, nonyl, and the like; alkenyl groups such as pentenyl and hexenyl groups and all of their respective isomers; cycloalkyl groups, such as cyclopropyl, cyclobutyl, cyclopentyl, cyclohexyl and the like; cycloalkenyl groups such as cyclohexenyl and the like; typical aryl groups include phenyl, benzyl, phenethyl, tolyl, naphthyl and the like.

Representative of the above-defined bis(hydrocarbyl)vinylphosphonates are:
Bis(beta-chloroethyl)vinylphosphonate;
Bis(beta-chloropropyl)vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl)vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl)vinylphosphonate From the above group of bis(hydrocarbyl)vinylphosphonate monomers, it is preferred to employ bis(beta-chloroethyl)vinylphosphonate in preparing the novel aqueous emulsion polymers of this invention since the latter monomer is a commercially available material and lower in cost than any of the other bis(hydrocarbyl)vinylphosphonates.

Although either a vinyl halide or a vinylidene halide monomer can be suitably employed as the halogen-containing ethylenically unsaturated monomer in the aqueous emulsion polymers of the present invention, it is considered preferable to employ vinylidene halide monomers since the vinylidene halide monomers when incorporated into polymers of the present invention impart a soft "hand" to substrates upon which they are coated or within which they are impregnated. The preferred third comonomer for use in the polymers of the present invention is an alkyl acrylate, preferably, the $C_4-C_8$ alkyl acrylates such as n-butyl acrylate and 2-ethylhexyl acrylate. It has been found that inclusion in the polymer of an alkyl acrylate aids in imparting good color stability and softness to the resulting polymer. It is to be noted, at this point, that the use of the term "polymer" in this disclosure is meant to apply to polymers derived from three or more distinct monomeric species.

In addition to the above described bis(hydrocarbyl)-vinylphosphonates, it is also possible to prepare aqueous emulsion polymers useful as flame retardant additives by employing: (1) mono (alkyl) acid vinylphosphonates such as, for example, mono(ethyl) hydrogen vinylphosphonate, mono(butyl) hydrogen vinylphosphonate, mono(octyl)hydrogen vinylphosphonate; mono(beta-chloroethyl)hydrogen vinylphosphonate, mono (omega-chlorooctyl)hydrogen vinylphosphonate; (2) mono(cycloalkyl) and mono(aryl)hydrogen vinylphosphonates such as, for example, mono(cyclohexyl)hydrogen vinylphosphonate, mono(phenyl) hydrogen vinylphosphonate, mono(benzyl)hydrogen vinylphosphonate; (3) bis(cycloalkyl) and bis(aryl)-vinylphosphonates, such as, for example, bis(cyclohexyl)vinylphosphonate and bis(benzyl) vinylphosphonates; and, (4) bis(alkyl), bis(cycloalkyl), and bis(aryl) allylphosphonates, such as, for example bis(beta-chloroethyl)allylphosphonate, bis(cyclohexyl) allylphosphonate and bis(benzyl)allylphosphonate as well as mixtures of any two or more of the above described phosphonate monomers.

The polymers of the present invention can be prepared by means of free radical initiated emulsion polymerization techniques well known to those skilled in the art. In these procedures, the various monomers and catalysts are emulsified, in water, by means of one or more surface-active emulsifiers whereupon the polymerization reaction is then initiated. Suitable water soluble, free radical initiating catalysts for use in preparing the copolymer latices of this invention include sodium, potassium and ammonium persulfate and hydrogen peroxide or one may use a redox system such, for example, as a mixture of a persulfate with an alkali metal bisulfite, thiosulfate or hydrosulfite. These catalysts should be present in a concentration of from about 0.05 to 5.0%, by weight, of the total monomer charge. With respect to the emulsifier or surfactant, it is possible to utilize one or more anionic, cationic, or non-ionic emulsifiers such, for example, as the alkyl carboxylic acid salts; the alkyl sulfate, sulfonate, phosphate, or sulfosuccinate salts; the alkyl aryl polyether alcohols, and the alkyl aryl polyether sulfate salts. The selected emulsifier or emulsifiers should be present in effective concentrations of from about 0.03 to 6.0%, by weight, of the total monomer charge. In addition, a protective colloid such as polyvinyl alcohol, polyvinyl pyrrolidone, methyl cellulose or gelatin can also, if desired, be present in the recipe in an effective concentration of from about 0.03 to 6.0%, by weight, of the total monomer charge. Alternatively, the protective colloid may be introduced into the polymer latex subsequent to its preparation. When post-added in this manner, the protective colloid should be present in a concentration of from about 0.03 to 6.0%, by weight, of the total resin solids. In any event, the presence of the protective colloid serves to enhance the mechanical stability of the emulsion.

The actual polymerization reaction will ordinarily be conducted at a temperature of from about 0° to 100° C. for a period of from about 1 to 24 hours, depending upon such factors as the particular monomer, catalysts, surfactants and polymerization apparatus that is being utilized. The latices resulting from this polymerization process will ordinarily have a resin solids content of from about 5 to 70%, by weight, wherein the particles have a diameter which ranges in size from about 0.03 to 3.0 microns.

With respect to proportions, these aqueous emulsion or latex polymer particles may contain from about 1 to 89% by weight, of one or more of the above described bis(hydrocarbyl) vinyl phosphonates, from about 10 to 98% by weight of one or more of the above-described halogen-containing ethylenically unsaturated monomers and from about 1 to 45% by weight of one or more of the above-described third comonomers. Optimum results, as flame retardant additives imparting good color stability to a wide variety of polymeric, natural, glass or mineral substrates and adapted to impart good "hand" to said substrates are obtained by use of polymers in accordance with the present invention containing from about 10 to 75% by weight of one or more of the bis(hydrocarbyl)vinylphosphonates, from about 20 to 85% by weight of one or more of the above-described halogen-containing ethylenically unsaturated monomers and from about 5 to 35% by weight of one or more of the above-described third comonomers. Most preferred, is a polymer containing about 45–55% by weight of bis(beta-chloroethyl)vinylphosphonate, 25–35% by weight of vinylidene chloride, 14–20% by weight of n-butyl acrylate and 1–5% by weight of N-methylol acrylamide. n-Butyl acrylate can be replaced, without affecting the properties of the latex polymer, by 2-ethyl hexyl acrylate. When 2-ethylhexyl acrylate is used, the most preferred composition contains 65–75% by weight of vinylidene chloride, 12–22% by weight of bis(beta-chloroethyl)vinylphosphonate, 5–13% by weight of 2-ethylhexyl acrylate and 1–5% by weight of N-methylol acrylamide.

With respect to the above-described proportions for the composition of the aqueous emulsion or latex polymers of this invention, it has been found that it becomes increasingly more difficult to attain good polymerization conversion rates as attempts are made to increase the amount of the bis(hydrocarbyl)vinylphosphonate in the resulting polymer substantially above a concentration of about 60% by weight. On the other hand, the use of these polymer emulsions as flame retardant additives becomes progressively more inefficient when they contain substantially less than about 5% by weight of one or more bis(hydrocarbyl)vinylphosphonates, since a rather high concentration of the polymer will then be required in order to attain flame retardancy. The use of such high concentrations of these polymer additives may, in turn, result in some deterioration in the inherent physical properties of the thus modified composition or material.

Specific aqueous emulsion polymer compositions which have been found to provide particularly good results as additives for the preparation of fire retardant compositions are:

1. a terpolymer of 81 parts by weight of vinylidene chloride, 5 parts by weight of n-butyl acrylate and 14 parts by weight of bis(beta-chloroethyl)vinylphosphonate;

2. a terpolymer containing 15 parts by weight of di-n-butyl vinyl phosphonate, 20 parts by weight of di-n-octyl fumarate and 65 parts by weight of vinylidene chloride;

3. a terpolymer containing 15 parts by weight bis(beta-chloroethyl)vinylphosphonate, 5 parts by weight propylene and 80 parts by weight vinylidene chloride;

4. a terpolymer containing 25 parts by weight vinylidene bromide, 65 parts by weight bis(beta-chloroethyl)vinyl phosphonate and 10 parts vinyl acetate; and 5. a polymer containing 50 parts by weight vinyl chloride, 35 parts by weight bis(2-chloroisopropyl) 1-methyl vinyl phosphonate, 15 parts by weight stearyl vinyl ether and 5 parts by weight N-methylol acrylamide.

It is important, with respect to this disclosure, to distinguish between the processes of suspension and emulsion polymerization. Thus, suspension polymerization refers to a method of polymerization whereby one or more monomers is dispersed in a suspension medium which is a non-solvent for both the monomer and the resulting polymer. Generally, water is utilized for this purpose and a monomer soluble polymerization initiator is thereupon introduced. Polymerization takes place within the monomer phase containing the polymerization initiator. The use of the suspending medium assists in the dissipation of the heat of reaction and the polymerization reaction is therefore easier to control. Suspension polymerization is generally accomplished by dispersing the monomer in the suspending medium either by constant agitation or by the use of a suspending agent or both. Various suspending agents are known in the art. These known suspending agents include gelatin, hydroxy methyl cellulose, hydroxy ethyl cellulose, hydroxy propyl cellulose, carboxy methyl cellulose, talc, clay, polyvinyl alcohol and the like.

By contrast, emulsion polymerization involves a process whereby one or more monomers are emulsified in the form of droplets within a continuous phase which should be inert with respect to both the emulsified monomers and the resulting polymer. Water is generally selected as the continuous phase. Emulsification of the monomers is facilitated by the use of one or more emulsification agents which tend to reduce the interfacial tension between the dispersed and continuous phases. Typical emulsifiers include common soaps, salts of long-chain carboxylic and sulfonic acids, alkylated aromatic sulfonic acids and salts of long-chain amines.

A water soluble initiator is employed and it is believed that the polymer chains originate in the continuous, aqueous phase and then continue their growth in the dispersed monomer-polymer phase yielding the polymer product in a finely divided state which remains emulsified within the continuous, aqueous medium. Thus, an important distinction between emulsion and suspension polymerization is that in the former, the monomer is either dispersed into droplets which are stabilized by an adsorbed layer of soap molecules or is solubilized in the soap micelle which is present in aqueous soap solutions. As a result, stable polymer emulsions are readily obtained; whereas, in a suspension polymerization, the resulting polymer particles are of a relatively larger mass which tend to more readily separate out from the suspension.

In all cases, the novel aqueous emulsion or latex polymers of this invention or the coagula or dried particles thereof have been found to provide blends with ordinarily flammable polymers in either emulsion, latex or dry, solid form; the emulsion or latex polymers of the invention also serve as binders for non-woven fabrics or coating for woven fabrics which are characterized by their outstanding fire retardancy. As used in this disclosure, the term "fire retardant" or "flame retardant" is intended to refer to that particular property of a material which provides it with a degree of resistance to ignition and burning. Thus, a fire or flame retardant composition is one which has a low level of flammability and flame spread. This property may be conveniently evaluated by means of any of the standard flame retardancy tests such, for example, as the ASTM test D-635.

As has been indicated, hereinabove, the aqueous emulsion or latex polymers of this invention are particularly suitable for blending with ordinarily flammable polymers which are in the form of aqueous systems such as solutions, suspensions, or, most preferably, emulsions. The resulting aqueous blends, like the aqueous emulsion or latex polymers of the present invention per se, may then be used in any of the various coating, adhesive, binding, laminating and impregnating applications known to those skilled in the art. Thus, these aqueous blends may be coated upon and/or absorbed by all types of substrates to which it is desired to impart fire retardant properties. They may, therefore, be used as coatings, impregnants, fillers, laminates, and adhesives for such substrates as wood; paper; metals; non-woven fabrics and woven textiles based on either natural, synthetic, mineral or glass fibers or blends thereof, for example, woven and non-woven fabrics and textiles made from fibers of cotton, wool, silk, polyester, nylon, rayon, asbestos, fiber glass and blends thereof; synthetic polymer films such as those based upon polyolefins, regenerated cellulose, i.e., cellophane, polyvinyl chloride, polyesters and the like; leather; natural and synthetic rubber; fiber-board; and synthetic plastics prepared by means of either addition or condensation polymerization techniques.

Any desired polymeric material may be blended with the above-described bis (hydrocarbyl) vinyl phosphonate polymer additives in order to prepare fire retardant compositions. If the polymeric material to be modified is in the form of an aqueous solution, suspension or emulsion, the polymer latex of this invention can be used as such as the flame retardant additive. If, on the other hand, the polymeric material to be modified is in the form of a solid or a solution in at least one organic solvent, then the preferred form of the flame retardant additive is the solid polymer coagulated from the polymer latex of the above-described composition. Such polymeric materials include:

1. Polymers of vinyl chloride including polyvinyl chloride and the random and graft copolymers of vinyl chloride with a minor proportion of one or more of the abovedescribed group of vinyl monomers which are included as comonomers for use in preparing the aqueous emulsion copolymers of this invention;

2. Polymers of the $C_1$-$C_8$ alkyl acrylates and methacrylates including their homopolymers and their copolymers with each other and with a minor proportion of such comonomers as the alpha-olefins, e.g. ethylene and propylene; the vinyl esters of carboxylic acids, e.g. vinyl acetate; ethyleneically unsaturated monocarboxylic acids, e.g. acrylic and methacrylic acids; ethylenically unsaturated dicarboxylic acids their anhydrides and their $C_1$-$C_{20}$ mono- and dialkyl esters, e.g. maleic acid, maleic anhydride, diethyl maleate and monobutyl acid maleate; vinylidene halides, e.g. vinylidene chloride; $C_1$-$C_{20}$ alkyl vinyl ethers, e.g. methyl vinyl ether; amides of ethylenically unsaturated monocarboxylic acids, e.g. acrylamide and the N-methylol and diacetone derivatives; vinyl aryl compounds, e.g. alphamethyl styrene and styrene; and, nitriles of alpha, beta-ethylenically unsaturated carboxylic acids, e.g. acrylonitrile and methacrylonitrile.

3. Polymers of nitriles of ethylenically unsaturated acids including polymethacrylonitrile, polyacrylonitrile and the copolymers of methacrylonitrile and acrylonitrile with a minor proportion of one or more vinyl monomers such as the lower alkyl acrylates and methacrylates, styrene and alphamethyl styrene;

4. Acrylonitrile-butadiene-styrene resins, commonly referred to as "ABS" resins, which generally comprise either a mixture of a 60 to 80:40 to 20 styrene:acrylonitrile copolymer with from about 10 to 40%, by weight, of a 5 to 40:95 to 60 acrylonitrile-butadiene copolymer or a mixture of a 60 to 80:40 to 20 styrene:acrylonitrile copolymer with from about 10 to 40%, by weight, of a graft of the latter copolymer onto polybutadiene;

5. Poly(alpha-olefins) such as polypropylene and polyethylene and copolymers of one or more alpha-olefins, such as ethylene or propylene, with a minor proportion of one or more ethylenically unsaturated monomers including 4-methyl pentene-1, butene-1, norbornene and its derivatives; cyclopentadiene, cyclopentene, cyclobutene, vinyl acetate, the $C_1$-$C_{12}$ alkyl acrylate and methacrylate esters, as well as blends of the homo and copolymers of alpha-olefins with other types of thermoplastic polymers;

6. Polymers of styrene including polystyrene, poly(alpha-methyl styrene) and poly(tertiary butyl styrene) and copolymers of styrene, alpha-methyl styrene or tertiary butyl styrene with a minor proportion of one or more ethylenically unsaturated comonomers such, for example, as nitriles or ethylenically unsaturated carboxylic acids including acrylonitrile and methacrylonitrile; $C_1$-$C_{12}$ alkyl esters of acrylic and methacrylic acids such, for example, as methyl methacrylate and 2-ethylhexyl acrylate; and, graft copolymers of styrene, tertiary butyl styrene or alpha-methyl styrene with polybutadiene and other hydrocarbon elastomers;

7. Cellulosic resins including cellulose esters and mixed esters such, for example, as cellulose nitrate, cellulose acetate-butyrate, cellulose acetate-propionate and cellulose ethers such, for example as ethyl cellulose;

8. Polyamide resins, i.e., the resins made by the condensation of di- or polyamines with di- or polybasic acids or by polymerization of lactams or amino acids. Typical polyamides include nylon 4 which is made from pyrrolidone; nylon 6 obtained by polycondensation of caprolactam; nylon 66 obtained by the condensation of hexamethylene diamine with adipic acid; nylon 610 obtained by the condensation of hexamethylenediamine with sebacic acid; nylon 7 which is a polymer of ethyl aminoheptanoate; nylon 9 made from 9-aminononanoic acid; and, nylon 11 made from 11-amino undecanoic acid;

9. Polyester resins, i.e., the resins produced by the condensation of saturated or unsaturated dibasic acids, such as terephthalic, maleic, fumaric, isophthalic, adipic and azelaic acids with dihydric alcohols such as ethylene glycol, propylene glycol, diethylene glycol and dipropylene glycol. Where the resin is made with an unsaturated acid, a polymerizable monomer such, for example, as styrene, vinyl toluene, diallyl phthalate, methyl methacrylate; chlorostyrene, alpha-methyl styrene, divinyl benzene or triallyl cyanurate is often included in the composition;

10. Polyurethane resins, i.e. the resins formed by the reaction between a bi- or polyfunctional hydroxyl containing compound, such as a polyether or polyester, and a di- or polyisocyanurate such as toluene diisocyanate or diphenylmethane-4,4'-diisocyanate;

11. Polycarbonate resins, i.e., the resins derived from the reaction between a difunctional alcohol or phenol, such as bis-phenol A, and phosgene or an alkyl or aryl carbonate;

12. Polyacetal resins, i.e. the resins derived from the anionic polymerization of formaldehyde to obtain a linear molecule of the type -O-$CH_2$-O-$CH_2$-O-$CH_2$-;

13. Polyphenylene oxide resins made by the oxidative polymerization of 2,6-dimethylphenol in the presence of a copper-amine-complex catalyst;

14. Polysulfone resins, i.e., the resins containing an $SO_2$ linkage as derived from the reaction of sulfur dioxide with olefins such as 1-butene or, more preferably, by reaction of bis-phenol A with 4,4'-dichlorodiphenyl sulfone;

15. The acrylate:styrene:acrylonitrile resins commonly referred to as "ASA" resins, which comprise copolymers containing a major proportion of a $C_2$-$C_8$ alkyl acrylate ester elastomer upon which is grafted about 65–95%, by weight of the latter copolymer, of a 70–80:30 – 20 styrene:acrylonitrile copolymer;

16. The methacrylate:butadiene:styrene resins, commonly referred to as the "MBS" resins, which comprise a minor proportion of a methyl methacrylate:styrene:acrylonitrile terpolymer grafted and/or blended with either polybutadiene or a copolymer of butadiene and minor proportions of such comonomers as, for example, styrene and acrylonitrile;

17. Polymers of vinyl acetate including polyvinyl acetate and the random and graft copolymers of vinyl chloride with a minor proportion of one or more of the vinyl monomers which were listed as optional comonomers for use in preparing the aqueous emulsion polymers of this invention; and, 18. Aminoplast resins made by the polycondensation of formaldehyde with a nitrogen containing compound such as urea or malamine; and 19. Phenolic resins made by the polycondensation of phenols with aldehydes such as formaldehyde, acetaldehyde or furfural aldehyde.

In effect, one may utilize any ordinarily flammable polymeric material in preparing fire retardant polyblends with the novel polymer additives of this invention. These ordinarily flammable polymeric materials may be thermoplastic polymers, i.e., polymers which can be softened by heat and which then regain their original properties on cooling. Also applicable are polymer systems comprising copolymers containing one or more crosslinkable comonomers, i.e, monomers containing two or more dissimilar functional groups, such, for example, as N-methylol acrylamide, N-methylol methacrylamide, glycidyl acrylate and glycidyl methacrylate. Thus, the polymers containing one or more of these crosslinkable comonomers can be cured or crosslinked, by the use of heat and/or catalysts and are thereby converted into a form in which they will no longer be thermoplastic but will, rather, be thermosetting, i.e., they will not dissolve in contact with a solvent or water. Ideally, the novel polymer additives of this invention would be blended with such crosslinkable copolymer systems prior to the time they undergo this curing or crosslinking operation.

The actual blending of the aqueous emulsion polymer additives of this invention with the selected polymeric materials i.e., with any one or more of the above described polymers, may be accomplished by means of any convenient procedure which will result in an intimate admixture of the additive within the polymeric mass. Thus, for example, an aqueous emulsion of latex containing the particles of the polymer additive may simply be blended or otherwise admixed with a polymer which should, preferably, be in the form of an aqueous solution, latex or suspension. The resulting aqueous blend can be used as such or can be cocoagulated to form a solid, polymeric blend. Or, if desired, the aqueous polymer emulsion of this invention can be coagulated by freezing or by addition of NaCl solution, methanol or the like to recover the polymer additive in solid particulate form. The polymer additive and another of the polymer's described above may be admixed while each is in the form of a solid.

The blending operation may also be carried out by means of a procedure in which the polymer to be modified is itself polymerized while in the presence of one of the previously polymerized aqueous emulsion polymer additives of this invention. Alternatively, the bis(hydrocarbyl)vinyl-phosphonate-containing aqueous emulsion polymer additive may be polymerized in a system which contains the previously polymerized polymer in an appropriate physical form, e.g. as an aqueous solution, suspension or emulsion.

With respect to proportions, the amount of bis(hydrocarbyl)vinylphosphonate-containing aqueous emulsion or latex polymer which may be admixed with an ordinarily flammable polymer will depend, primarily, upon such factors as the particular phosphonate polymer and the polymer which is to be blended with one another, the degree of fire retardancy desired in the resulting blend, the degree of clarity, hardness and other specific physical properties which are sought as well as other technical and economic considerations known and understood by those skilled in the art. However, in order to attain a composition which will be self-extinguishing, it is generally desirable to introduce an effective concentration of bis(alkyl)vinylphosphonate aqueous emulsion polymer solids which will be sufficient to provide the resulting blend with at least about 0.5%, by weight, of phosphorus and with at least about 10%, by weight, of halogen, i.e., chlorine and/or bromine, derived from the halogen containing ethylenically unsaturated monomer and also, if possible, from the bis(hydrocarbyl)vinylphosphonate.

The fire retardant polymer compositions of this invention can be prepared so as to contain various optional additives which may include plasticizers such as the alkyl esters of phthalic, adipic and sebacic acids such, for example, as dioctyl phthalate and ditridecyl phthalate and aryl phosphate esters such, for example, as triphenyl and tricresyl phosphate, etc.; lubricants and mold release agents such as stearic acid or its metal salts, petroleum based waxes, mineral oils and their halogenated products, polyethylene waxes and their halogenated product etc.; and heat and light stabilizers such as barium, cadmium, calcium, zinc soaps or phenates, basic lead compounds, organo-tin compounds, such as dialkyl tin mercaptides and dialkyl tin maleates, thiolauric anhydride and n-butyl stannoic acid, epoxidized oils, alkyl diphenyl phosphites, triaryl phosphites, phenyl salicylates, o-hydroxy benzophenones and benzotriazoles, etc. For a more complete listing of plasticizers, lubricants, stabilizers and other functional additives, one may consult "Polyvinyl Chloride" by H. A. Sarvetnick published by Van Nostrand Reinhold Co., New York, N.Y., in 1969.

The compositions of this invention may also contain fillers, pigments, dyes, opacifying agents, decorative additives such as reflective metal foils or flakes, and other imbedded solid objects such as fiber glass, textile fibers, asbestos, and the like, provided that they do not detract from the flame retardancy of these products. In addition, the compositions may contain other flame retardants such as antimony compounds, zinc borate, aluminum hydrate, halogenated alkyl phosphates or phosphonates, alkyl acid phosphates, or small concentrations of phosphoric acid.

The novel fire retardant compositions of this invention, whether comprising blends of any of the above described polymeric material with one or more of the novel fire retardant additives of this invention or whether comprising the fire retardant additives of the present invention, per se, may be utilized in any of the coating, adhesive, impregnating laminating, binding and painting applications known to those skilled in the art wherein it is desired to provide fire retardancy to the resulting end product. For example, these compositions may be used in such application as rug and carpet backing adhesives, as adhesives for fiber glass, as a backing coating for fabrics, as heat sealable binders for nonwoven fabrics, as flooring, coatings, as paper coatings, as paint bases and as adhesives for preparing laminated structures.

In addition to being used as fire retardant additives for the preparation of fire retardant polymer blends with flammable polymer substrates, the aqueous emulsion polymer additives of this invention may be used, per se, in any of the various coating, painting adhesive, laminating, impregnating and binding applications known to those skilled in the art. Thus, they may be coated upon and/or adsorbed by all types of substrates to which it is desired to impart fire retardant properties. They may, therefore, be used as coatings, impregnants, fillers, laminants, and adhesives for such substrates as wood; paper; metals; non-woven fabrics and textiles based on either natural, synthetic, mineral or glass fibers or blends thereof; synthetic polymer films such as those based upon polyolefins, regenerated cellulose, i.e., cellophane, polyvinyl chloride, polyesters and the like; leather, natural and synthetic rubber; fiberboard; and, synthetic plastics prepared by means of either addition or condensation polymerization techniques.

The following examples will further illustrate the various embodiments of this invention. In these examples, all parts and percentages given are by weight unless otherwise noted.

In the following examples, the polymers obtained are evaluated for color stability, fire retardant (FR) properties and hand as follows:

1. Color Stability

Film samples cast from various latices are placed in a forced air oven set at 60° C. for 8 hours. The samples are then rated as possessing good color stability if they remained clear and colorless and as possessing poor color stability if they turned yellow to brown.

2. FR Properties

Film samples cast from various latices are held in a vertical position and ignited for 2 seconds with a Bunsen burner. The burner is then removed. Samples which self-extinguished and would not continue to burn within 5 seconds after the burner was removed were noted as possessing good FR properties. Samples which continued to burn for more than 5 seconds after removal of the burner or burn the entire length within 5 seconds were noted as possessing poor FR properties.

3. Hand

Hand is evaluated by flexing films cast from various latices. A hard film can be readily distinguished from a soft film upon flexing of the film.

EXAMPLE 1

Into a 32 ounce polymerization vessel, there are charged 120 parts bis(beta-chloroethyl)vinylphosphonate, hereinafter referred to as "bis-beta", 90 parts n-butyl acrylate, 90 parts vinylidene chloride, 110 parts deionized water, 60 parts of a 10% aqueous solution of sodium lauryl sulfate and 120 parts of a 5% aqueous solution of polyvinyl alcohol. The pH of the resulting mixture is adjusted to a value of about 8 by addition of 3.3 parts of 58% aqueous solution of ammonium hydroxide, whereupon 110 parts of a 5% aqueous solution of ammonium persulfate is added to the mixture. The air space above the liquid level in the reactor is purged with nitrogen and the vessel is sealed. The vessel is shaken to form a stable emulsion. Polymerization is effected at a temperature of 55° C. over a period of 12 hours with a polymerization vessel being continuously subjected to a tumbling agitation. A stable latex of good color stability is obtained. When the latex is poured onto a Petri dish and dried, a film exhibiting a soft hand is recovered. When ignited with a Bunsen burner for two seconds and the burner then removed, the film does not support combustion and therefore exhibits good FR properties.

A portion of the emulsion prepared above is blended with an aqueous emulsion containing 46% of polybutyl acrylate polymer particles whose films are ordinarily flammable. The concentration of the bis-beta polymer solids in the blend is 20% based on the polybutyl acrylate solids. A film having a dry thickness of 5 mils is cast from the polymer blend and is found to exhibit good fire retardance.

EXAMPLES 2–8

The following polymers are prepared as set forth below:

(2) vinylidene chloride 65 parts

|     |                                       |      |       |
| --- | ------------------------------------- | ---- | ----- |
|     | di-n-butyl vinyl phosphonate          | 15   | parts |
|     | di-n-octyl fumarate                   | 20   | parts |
| (3) | vinylidene chloride                   | 80   | parts |
|     | bis(beta-chloroethyl)vinylphosphonate | 15   | parts |
|     | propylene                             | 5    | parts |
| (4) | vinylidene bromide                    | 25   | parts |
|     | bis(beta-chloroethyl)vinylphosphonate | 65   | parts |
|     | vinyl acetate                         | 10   | parts |
| (5) | bis(beta-chloroethyl)vinylphosphonate | 50   | parts |
|     | vinylidene chloride                   | 30   | parts |
|     | 2-ethylhexyl acrylate                 | 20   | parts |
| (6) | vinylidene chloride                   | 68   | parts |
|     | bis(beta-chloroethyl)vinylphosphonate | 19   | parts |
|     | 2-ethylhexyl acrylate                 | 9    | parts |
|     | N-methylol acrylamide                 | 4    | parts |
| (7) | vinyl chloride                        | 50   | parts |
|     | bis(2-chloroisopropyl)1-methylvinyl-phosphonate | 35 | parts |
|     | stearyl vinyl ether                   | 15   | parts |
|     | N-methylol acrylamide                 | 5    | parts |
| (8) | bis(beta-chloroethyl)vinylphosphonate | 47.6 | parts |
|     | vinylidene chloride                   | 28.6 | parts |
|     | n-butyl acrylate                      | 19.0 | parts |
|     | N-methylol acrylamide                 | 4.8  | parts |

Each of the above monomer mixtures is added to 100 parts of deionized water containing 6 parts of sodium lauryl sulfate and 3 parts of ammonium persulfate in a suitable reaction vessel. The air space above the liquid level is purged with nitrogen and the vessel is sealed. The vessel is gently stirred to form a stable emulsion and then maintained at 60° C for 16 hours. In each instance, a stable latex of good color stability is obtained. When the latices are poured onto a Petri dish and dried, soft films are recovered. When ignited with a Bunsen burner for 2 seconds and the burner is removed, the films do not support combustion.

EXAMPLES 9–10

These examples compare polymers obtained in accordance with the present invention containing bis-beta, n-butyl acrylate and vinylidene chloride with prior art polymers containing bis-beta, n-butyl acrylate, vinylidene chloride and acrylic acid (U.S. Pat. No. 3,682,871) and polymers containing bis-beta, n-butyl acrylate, vinylidene chloride and acrylonitrile (U.S. Pat. No. 3,489,706).

The polymers are prepared in the manner set forth in Examples 2–8. Table I below, summarizes the reactants, conditions and results obtained.

TABLE I

| COMPOSITION PARTS | Comparative Example U.S. 3,682,871 | Example 9 | Example 10 | Comparative Example U.S. 3,489,706 |
| --- | --- | --- | --- | --- |
| Bis-Beta | 12 | 12 | 25 | 25 |
| n-Butyl Acrylate | 35 | 35 | 59 | 59 |
| Vinylidene Chloride | 50 | 50 | 50 | 50 |
| Acrylonitrile | — | — | — | 12 |
| Acrylic Acid | 10 | — | — | — |
| N-Methylol Acrylamide | 1.5 | 1.5 | 1.5 | 1.5 |
| Time Hrs. | 12 | 12 | 12 | 12 |
| Temp. ° C | 55 | 55 | 60 | 60 |
| Deionized H$_2$O | 25 | 25 | 100 | 100 |
| Sodium Lauryl Sulfate (10% Soln) | 35 | 35 | 100 | 100 |
| Ammonium Persulfate (5% Soln) | 40 | 40 | — | — |
| NaCO$_3$/NaHCO$_3$ | — | — | 1/1 | 1/1 |
| Ammonium Persulfate | — | — | 0.4 | 0.4 |
| FILM EVALUATION | | | | |
| Color Stability | Poor | Good | Good | Poor |
| FR Properties | Good | Good | Good | Good |
| "HAND" | Hard | Soft | Soft | Hard |

It can be clearly seen that the polymers of the present invention are superior to those of the prior art both with respect to color stability and especially hand.

EXAMPLES 11–12

Examples 11 and 12 illustrate that a soft hand can be imparted to the polymers of the present invention by substituting vinylidene chloride for vinyl chloride in the polymer. Surprisingly, as shown in the comparative examples, copolymers of bis beta and either vinyl chloride or vinylidene chloride are characterized by a hard hand and poor color stability; whereas, a bis-beta copolymer with n-butyl acrylate, while possessing good color stability and soft hand exhibits poor FR properties.

The polymers are prepared in the manner set forth in Example 1. Table II below summarizes the reactants, conditions and results obtained.

TABLE II

| COMPOSITION PARTS | Example 11 | Example 12 | Comparative Examples | | |
|---|---|---|---|---|---|
| Bis-Beta | 120 | 120 | 120 | 120 | 120 |
| n-Butyl Acrylate | 90 | 90 | — | — | 180 |
| Vinylidene Chloride | 90 | — | 180 | — | — |
| Vinyl Chloride | — | 90 | — | 90 | — |
| Time Hrs | 12 | 12 | 12 | 12 | 12 |
| Temp. ° C | 55 | 55 | 55 | 55 | |
| Deionized H$_2$O | 110 | 110 | 110 | 110 | 110 |
| Sodium Lauryl Sulfate (10% Soln) | 60 | 60 | 60 | 60 | 60 |
| Ammonium Persulfate (5% Soln) | 110 | 110 | 110 | 110 | 110 |
| Polyvinyl Alcohol (5% Soln) | 120 | 120 | 120 | 120 | 120 |
| Conc NH$_4$OH | 3.3 | 3.3 | 3.3 | 3.3 | 3.3 |
| FILM EVALUATION | | | | | |
| Color Stability | Good | Good | Poor | Poor | Good |
| FR Properties | Good | Good | Good | Good | Poor |
| "HAND" | Soft | Hard | Hard | Hard | Soft |

EXAMPLES 13–14

Examples 13 and 14 as compared with the comparative example illustrate that even among similar terpolymers, the particular combination of comonomers in the terpolymers of the present invention provide terpolymers of significantly better properties as compared to such similar terpolymers.

The polymers are prepared in the manner set forth in Example 1. Table III below summarizes the reactants, conditions and results obtained.

TABLE III

| Composition Parts | Example 13 | Example 14 | Comparative Example |
|---|---|---|---|
| Bis-Beta | 120 | 120 | 120 |
| n-Butyl Acrylate | 90 | 90 | — |
| Vinylidene Chloride | 90 | — | 90 |
| Vinyl Chloride | — | 90 | 90 |
| Time Hrs | 12 | 12 | 12 |
| Temp. ° C | 55 | 55 | 55 |
| Deionized H$_2$O | 110 | 110 | 110 |
| Sodium Lauryl Sulfate (10% Soln) | 60 | 60 | 60 |
| Ammonium Persulfate (5% Soln) | 110 | 110 | 110 |
| Polyvinyl Alcohol (5% Soln) | 120 | 120 | 120 |
| Conc NH$_4$OH | 3.3 | 3.3 | 3.3 |
| FILM EVALUATION | | | |
| Color Stability | Good | Good | Poor |
| FR Properties | Good | Good | Good |
| "HAND" | Soft | Hard | Hard |

EXAMPLES 15–17

Examples 15 to 17 illustrate that terpolymers exhibiting excellent properties can be obtained with a wide variety of crosslinking agents.

The polymers are prepared in the manner set forth in Example 1 and in Examples 2–8. The reactants, conditions and results obtained are summarized in Table IV.

TABLE IV

| COMPOSITION PARTS | Example 15 | Example 16 | Example 17 |
|---|---|---|---|
| Bis-Beta | 25 | 120 | 120 |
| n-Butyl Acrylate | 59 | 90 | 90 |
| Vinylidene Chloride | 50 | 90 | 90 |
| Glycidyl methacrylate | — | 10 | — |
| Di Acetone Acrylamide | — | — | 10 |
| N-Methylol Acrylamide | 1.5 | — | — |
| Time Hrs. | 12 | 12 | 12 |
| Temp. ° C | 60 | 55 | 55 |
| Deionized H$_2$O | 100 | 110 | 110 |
| Sodium Lauryl Sulfate (10% Soln) | 100 | 60 | 60 |
| Ammonium Persulfate (5% Soln) | — | 110 | 110 |
| NaCO$_3$/NaHCO$_3$ | 1/1 | — | — |
| Ammonium Persulfate | 0.4 | — | — |
| Polyvinyl Alcohol (5% Soln) | — | 120 | 120 |
| Conc NH$_4$OH | — | 3.3 | 3.3 |
| FILM EVALUATION | | | |
| Color Stability | Good | Good | Good |
| FR Properties | Good | Good | Good |
| "HAND" | Soft | Soft | Soft |

EXAMPLE 18

Two pad baths were prepared by mixing the following ingredients:

| | A | B |
|---|---|---|
| A polymer latex prepared according to Ex. 1 (adjusted to 50% solids) | 120 parts | |
| A commercial all-acrylic latex (50% solids) | | 120 parts |
| Water | 50 parts | 50 parts |

Two pieces of a 1½ oz non-woven fabric consisting of cotton fibers laminated on a rayon scrim were used in this test. One was immersed in bath A and the other in bath B. They were squeeze-dried and then heated at 170° C. for 8 minutes. The dried fabrics were cut into 2×12 inch test strips for flammability testing after conditioning for 24 hours at 78° F. and 80% relative humidity.

The samples were kept at a vertical position. A 2-second contact with a Bunsen burner flame ignited the samples. Upon removal of the flame, the samples treated with bath B burned the entire length of 12 inches and the samples treated with bath A left a char length of about 6 inches. This is, the flame propagated to half the length of the test samples and extinguished by itself.

EXAMPLE 19

A commercial stocking of nylon 6,6(poly-hexamethylene adipamide) was cut into 2 pieces and treated with bath A and bath B separately as described in Example 18. Flammability tests showed that samples treated with bath A were self-extinguishing upon removal of flame and samples treated with bath B burned the entire length.

EXAMPLE 20

A commercial garment of 65/35 polyester/rayon blend was cut into 2 pieces and treated with bath A and bath B separately, as described in Example 18. Flammability tests showed that samples treated with bath A were self-extinguishing and samples treated with bath B burned the entire length.

EXAMPLE 21

Two pad baths were prepared by mixing the following ingredients:

|  | C | D |
|---|---|---|
| A polymer latex prepared according to Example 6 (adjusted to 48% solids) | — | 100 parts |
| A commercial all-acrylic latex (48% solids) | 200 parts | 100 parts |
| Aqueous pigment dispersion (Inmont 26-9750 blue) | 10 parts | 10 parts |
| 10% glass coupling agent solution (10% hydrolyzed Dow-Corning Z-6040) | 100 parts | 100 parts |
| 10% oxalic acid in water | 10 parts | 10 parts |

Pieces of glass fabric, 4.5 oz. per square yard Beta casement fabric, were impregnated with either bath C or bath D, squeezed with a roller and dried in air, followed by placing in a 100° C oven for 10 minutes. The fabrics weight increased by 6.5%. Strips of 2×12 inches were cut for flammability tests after conditioning for 24 hours at 76° F and 85% relative humidity. They were kept in a vertical position and ignited by 2 successive 3-second contacts with the flame of a Bunsen burner. After ignition, samples treated with bath C burned the entire length; whereas, samples treated with bath D were difficult to ignite and self-extinguished after removal of the burner flame.

Although specific materials and conditions were set forth in the above exemplary processes in making and using the fire retardant polymers and blends of the present invention, these are merely intended as illustrations of the present invention. Various other reactants, conditions, additives and ordinarily flammable polymers such as those listed above may be substituted in the examples with similar results.

Other modifications of the present invention will occur to those skilled in the art upon a reading of the present disclosure. These are intended to be included within the scope of this invention.

What is claimed is:

1. An aqueous emulsion comprising particles of an emulsion polymer consisting essentially of:
   1. from about 10 to 98% by weight of a vinyl or vinylidine halide;
   2. from about 1% to 89% by weight of at least one bis(hydrocarbyl)vinyl phosphonate having the structure:

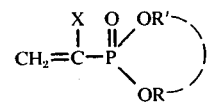

wherein X is selected from the group consisting of hydrogen, halogen, cyano, aryl, $C_1$–$C_{18}$ alkyl and

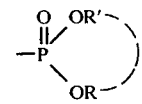

wherein R and R' are hydrocarbyl and substituted hydrocarbyl groups which can be the same, different or conjoint; and
   3. from about 1 to 45% by weight of at least one third comonomer selected from the vinyl esters of carboxylic acids.

2. An aqueous emulsion as defined in claim 1 wherein the halide is vinylidene chloride.

3. An aqueous emulsion as defined in claim 1 wherein the third comonomer is selected from the group consisting of vinyl acetate, vinyl butyrate and vinyl stearate.

4. An aqueous emulsion as defined in claim 1 wherein the bis(hydrocarbyl)vinyl phosphonate is bis(-beta halo lower alkyl)vinyl phosphonate.

5. An aqueous emulsion as defined in claim 1 wherein the bis(beta haloalkyl)vinyl phosphonate is bis(beta chloroethyl)vinyl phosphonate.

6. An aqueous emulsion as defined in claim 1 wherein the emulsion polymer consists essentially of vinylidene chloride, bis(beta-chloroethyl)vinyl phosphonate, and a vinyl ester of a carboxylic acid.

7. An aqueous emulsion as defined in claim 6 wherein the vinyl ester of the carboxylic acid is selected from the group consisting of vinyl acetate, vinyl butyrate and vinyl stearate.

8. An aqueous emulsion as defined in claim 7 wherein the vinyl ester is vinyl acetate.

9. An aqueous emulsion as defined in claim 1 wherein the emulsion polymer consists essentially of about 65% by weight of bis(beta-chloroethyl)vinyl phosphonate, about 25% by weight of vinylidene bromide and about 10% by weight of vinyl acetate.

10. An aqueous emulsion comprising particles of an emulsion polymer consisting essentially of:
   1. from about 10 to 98% by weight of a vinyl or vinylidine halide;

2. from about 1 to 89% by weight of at least one bis(hydrocarbyl)vinyl phosphonate having the structure:

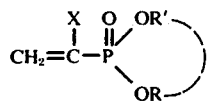

wherein X is selected from the group consisting of hydrogen, halogen, cyano, aryl, $C_1$–$C_{18}$ alkyl and

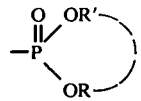

wherein R and R' are hydrocarbyl and substituted hydrocarbyl groups which can be the same, different or conjoint;

3. from about 1 to 45% by weight of at least one third comonomer selected from the vinyl esters of carboxylic acid; and 4. from 1 to 5% by weight of N-methylol acrylamide.

* * * * *

UNITED STATES PATENT AND TRADEMARK OFFICE
CERTIFICATE OF CORRECTION

PATENT NO. : 4,014,836
DATED : March 29, 1977
INVENTOR(S) : Paul Kraft et al.

It is certified that error appears in the above-identified patent and that said Letters Patent are hereby corrected as shown below:

Col. 1, line 26, "repairing" should be -- requiring --;

Cols. 15-16, Table II, -- 55 -- should appear for the "Temp. °C" value in the Comparative Example on the right hand side;

Signed and Sealed this

Twenty-fifth Day of September 1979

[SEAL]

Attest:

LUTRELLE F. PARKER
Attesting Officer   Acting Commissioner of Patents and Trademarks